J. A. MISENER.
SPLIT PULLEY.
APPLICATION FILED OCT. 10, 1919.

1,359,822.

Patented Nov. 23, 1920.

INVENTOR
JOSEPH A. MISENER

UNITED STATES PATENT OFFICE.

JOSEPH ALFRED MISENER, OF NIAGARA FALLS, ONTARIO, CANADA.

SPLIT PULLEY.

1,359,822. Specification of Letters Patent. Patented Nov. 23, 1920.

Application filed October 10, 1919. Serial No. 329,862.

*To all whom it may concern:*

Be it known that I, JOSEPH ALFRED MISENER, of the city of Niagara Falls, in the county of Welland, in the Province of Ontario, Canada, have invented certain new and useful Improvements in Split Pulleys, of which the following is the specification.

My invention relates to improvements in split pulleys and the object of the invention is to devise a pulley which may be firmly clamped to a supporting shaft so that there will be no danger of slippage, and it consists essentially of the following arrangement and construction of parts hereinafter more particularly explained.

In the drawings like characters of reference indicate corresponding parts in the various figures.

Figures 1, 2, 3:
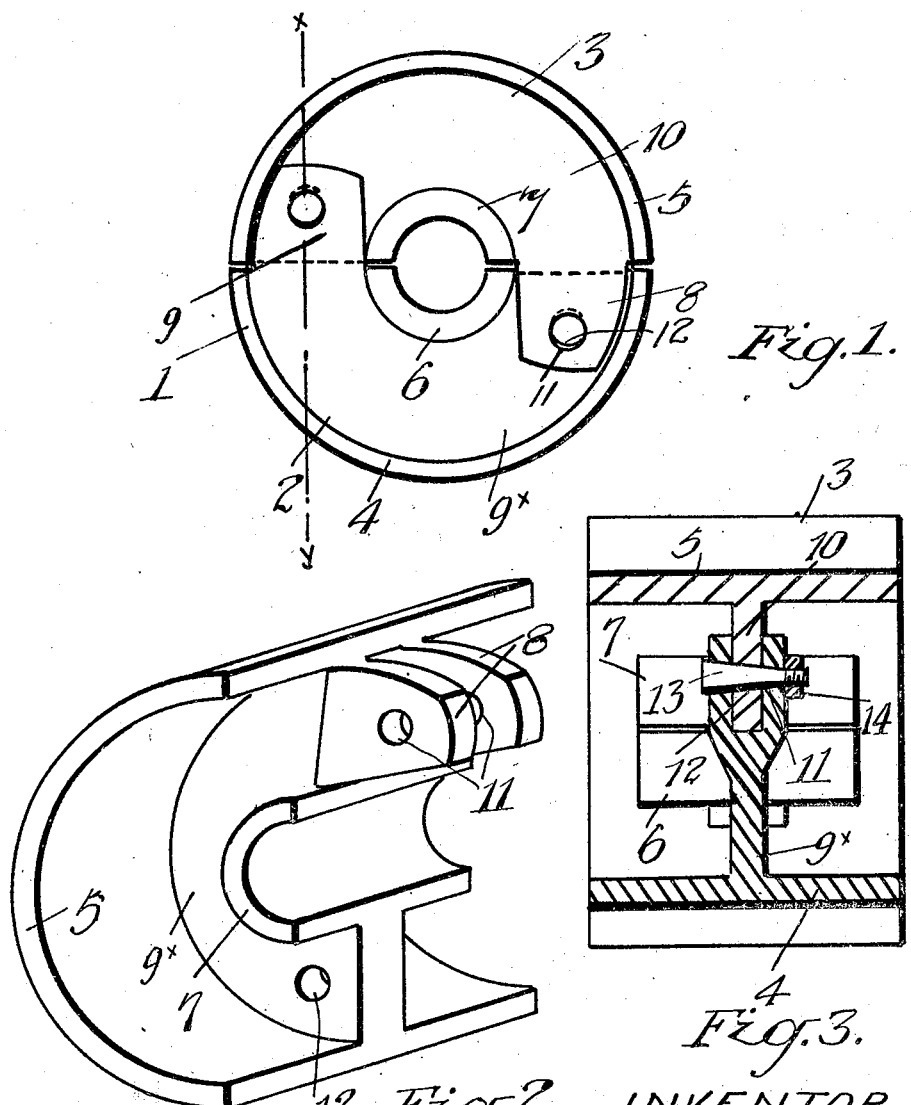
Figure 1, is a face view of my pulley.
Fig. 2 is a perspective detail of one half section of the pulley.
Fig. 3 is a sectional view on line $x$—$y$, Fig. 1.

1 indicates a pulley which is divided into two portions 2 and 3, one portion 2, being provided with a half rim 4 and the other portion 3 with a half rim 5. The portion 2 is also provided with a half hub 6 and the portion 3 with a half hub 7. The portion 3 between the hub portion 6 and the rim portion 4 is provided with lug extensions 8 which extend on each side of the web $9^x$ of the pulley portion 2. The pulley portion 2 is provided at the opposite side of the hub portion 7 with lug portions 9 which extend on each side of the web 10 of the pulley portion 2. The bore of the hub 7 is first bored so as to be slightly less in diameter than the diameter of the supporting shaft. The two halves 2 and 3 of the pulley are then clamped together in close contact one with the other, the holes 11 extending through the lug portion 8 and 9 and the holes 12 extending through the webs 9 and 10 are bored to aline. Thus a hole is bored through the lug portion 8 and the lug portions 9 and intervening portion of the corresponding webs $9^x$ and 10.

When the pulley is placed upon the shaft it will be approximately in the position shown in Fig. 1. Tapered pins 13 are then driven through the holes 12 and 11 thereby drawing the parts together and clamping them firmly upon the suporting shaft, a nut 14 being screwed onto the small end of the tapered pin 13 thereby locking the parts securely together.

What I claim as my invention is.

1. In a split pulley, the combination with the divided portion of the pulley provided with the usual half rim, half hub and web portions, of lug extensions extending from the web of each divided portion at opposite sides of the hub and wedging means adapted to extend through the lug and web portions intervening between the lugs for drawing the divided portions of the pulley together into contact with the supporting shaft.

2. A pulley made in sections each comprising a half rim half hub and a central web portion and an orifice formed in the web at one side of the hub, and lugs extending from the web portion at the opposite side of the hub and having orifices, the lugs of one section being adapted to receive the web portion of the other section therebetween and to have the apertures therein alined with the apertures in said web portion and a tapered pin adapted to be driven through the apertures of the lugs and webs to draw said apertures into alinement and to secure the sections of the pulley.

JOSEPH ALFRED MISENER.